United States Patent
Morgan et al.

[11] Patent Number: 6,018,424
[45] Date of Patent: Jan. 25, 2000

[54] CONFORMAL WINDOW DESIGN WITH STATIC AND DYNAMIC ABERRATION CORRECTION

[75] Inventors: Darcy J. Morgan, Irvine; Lacy Cook, El Segundo, both of Calif.

[73] Assignee: Raytheon Company, El Segundo, Calif.

[21] Appl. No.: 08/764,413

[22] Filed: Dec. 11, 1996

[51] Int. Cl.[7] .................................................. G02B 3/02
[52] U.S. Cl. ........................ 359/708; 359/234; 359/236; 359/613; 359/712
[58] Field of Search .................. 359/708, 554, 359/557, 712, 613, 234, 236

[56] References Cited

U.S. PATENT DOCUMENTS

| | | | |
|---|---|---|---|
| 4,864,137 | 9/1989 | Klein | 359/708 |
| 4,961,625 | 10/1990 | Wood et al. | 359/708 |
| 5,214,532 | 5/1993 | Hall, et al. | 359/356 |
| 5,220,159 | 6/1993 | Friedenthal | 250/201.9 |
| 5,231,379 | 7/1993 | Wood et al. | 359/708 |
| 5,526,181 | 6/1996 | Kunick et al. | 359/613 |

FOREIGN PATENT DOCUMENTS 2138591  10/1984  United Kingdom .
WO 87/03681  6/1987  WIPO .

OTHER PUBLICATIONS

Buchroeder and Hooker, "Aberration generator", vol. 14, No. 10, Oct. 1975, pp. 2476–2479.

Primary Examiner—Georgia Y. Epps
Assistant Examiner—Jordan M. Schwartz
Attorney, Agent, or Firm—Leonard A. Alkov; William C. Schubert; Glenn H. Lenzen, Jr.

[57] ABSTRACT

A system for correcting optical aberration created by a conformal window has a conformal window (12) with an outer surface (26) and an inner surface (28). The inner surface (28) is an aspheric surface for compensating for higher order aberrations. An aberration generator (16) is aligned to receive input from the conformal window (12) and dynamically corrects lower order aberrations, notably focus and astigmatism, over the field of regard.

15 Claims, 3 Drawing Sheets

CONFORMAL WINDOW DESIGN WITH STATIC AND DYNAMIC ABERRATION CORRECTION

BACKGROUND OF THE INVENTION

1. Technical Field

The present invention is directed to a system for correcting optical aberration created by conformal windows. More specifically, the present invention is directed to a system for correcting optical aberration utilizing static and dynamic aberration correction means.

2. Discussion

Airborne optical sensors must be isolated from the environment to function properly and to preserve the aerodynamic effect of the aircraft design. This isolation is usually accomplished by placing the sensor behind a window. Current electro-optical sensors on high performance aircraft are primarily limited to pod mounted configurations which are a primary source of aircraft drag and radar cross-section signature.

The window must be designed to provide the proper field of regard for the sensor. What is meant by the field of regard is the complete set of ordered pairs of values representing azimuth and elevation viewing angles through which the sensor can be pointed or gimbaled. In context to this specification, this is in contradiction to the field of view which corresponds to the locus of points which the sensor can instantaneously observe given a particular orientation within the field of regard. Typically the field of view of an optical sensor is significantly smaller than its field of regard.

Aircraft window design for isolating optical sensors is driven by two considerations: maintaining the aerodynamic efficiency of the overall aircraft design and the need to render the field of regard of the sensor as free of optical distortion and aberration as is practicable.

Conformal windows, which are windows having contours matching those of the surrounding surfaces of the aircraft in the context of the present application, offer the most favorable aerodynamic shape for maintaining the overall efficiency of the aircraft design. However, conformal windows create considerable optical aberration which varies greatly as a sensor is gimbaled or pointed through the field of regard.

As a consequence to the considerable optical aberration created by the conformal windows and the difficulty of correcting such widely varying amounts of aberration, designers of on-board sensor systems typically prefer to use flat or spherical windows to protect sensors from airborne environments. Although the use of non-conformal windows benefits the sensor designers, the aircraft suffers from increased air resistance as a result of this design choice. The principal type of optical aberrations associated with conformal windows are coma and astigmatism. What is meant by coma in the context of the present application is the variation of magnification as a function of the aperture. Also in the context of the present application, astigmatism is the difference in focus location for fans of rays in the sagittal and tangential planes.

In previously known systems, the problem of correcting coma and astigmatism due to the use of conformal windows has not been resolved by optical means. A device for generating optical aberration has been previously disclosed, e.g. see Aberration Generator by R. A. Buchroeder and R. Brian Hooker, Journal of Applied Optics (1975), however this device provides limited amounts of optical aberration when compared to the amount of optical aberration required in the context of the present invention. For this reason, the aberration generator disclosed in the above mentioned reference is inadequate for the present application. As above mentioned, absent an acceptable optical solution to aberration correction, designers are forced to use flat or spherical windows as mentioned above. Because these window designs reduce aerodynamic efficiency, smaller windows may be used to limit aerodynamic degradation. As a result, the sensor field of regard is limited.

U.S. Pat. No. 5,526,181, assigned to the Assignee of the present invention, the specification and drawings of which are herein expressly incorporated by reference, discloses a device compensating for the optical aberration created by a conformal aerodynamic window having a generally cylindrical shape. A one-dimensional corrector plate provides a varying amount of coma. The corrector plate has aspherical deviations in one direction only and is capable of being displaced in a direction perpendicular to an optical axis of the system. The corrector plate further has an axis of bilateral symmetry while lacking an axis of rotational symmetry. While this system works adequately for its intended purpose, the corrector plate is difficult to manufacture and the corrector plate needs to be decentered which decentering motion is the hardest to implement in the system. The invention also depends on the shape of the window being cylindrical, which is typically not the most desired conformed shape.

Future sensors must be internally mounted and look through windows that conform to the aircraft shape in order to achieve desired increases in aerodynamics and radar cross section performance. These goals must be accomplished while retaining optical performance without a huge increase in system complexity. The system should be simple, easy to build and install, and cost effective.

SUMMARY OF THE INVENTION

The present invention provides the art with a system which increases aerodynamic performance without increasing the complexity of the system. The system enables internally mounted sensor configurations. The system of the present invention includes a conformal window having an outer surface and an inner surface. The inner surface is aspheric to compensate for higher order aberrations. Also, an aberration generator is aligned to receive input from the conformal window. The aberration generator compensates for the lower order aberrations. The outer surface of the conformal window may be an off-axis portion of a paraboloid to improve aerodynamic performance. Also, the inner surface is a bilaterally symmetric Zernike described aspheric which also has a substantially parabolic surface. The aberration generator includes at least two lenses and the lenses are axially and rotatably movable to compensate for lower order aberrations such as focus and astigmatism.

The aberration corrector of the present invention has significant advantages over previously known systems. By providing a static conformal window which compensates for the higher order optical aberrations, the window can be designed to increase aerodynamic characteristics. Thus, the aberration generator may be much simpler requiring only rotational and axial movement to compensate for the lower order aberrations of focus and astigmatism. Axial movement of the lenses of the aberration generator will change the amount of the focus as well as the mount of the astigmatism and rotation of the lenses as a group will change the clocking or orientation of the astigmatism.

Since the present invention provides an optical solution to the correction of coma and astigmatism created by a conformal window, sensors may be designed which have larger fields of regard. Also, design options for the windows which protect the sensors are increased to allow for the design of conformal aircraft windows which could not have been used previously as a result of aberration they produce. Consequently, the aerodynamic efficiency of the aircraft design is increased.

DETAILED DESCRIPTION OF THE PREFERRED EMBODIMENT

Figure 1:
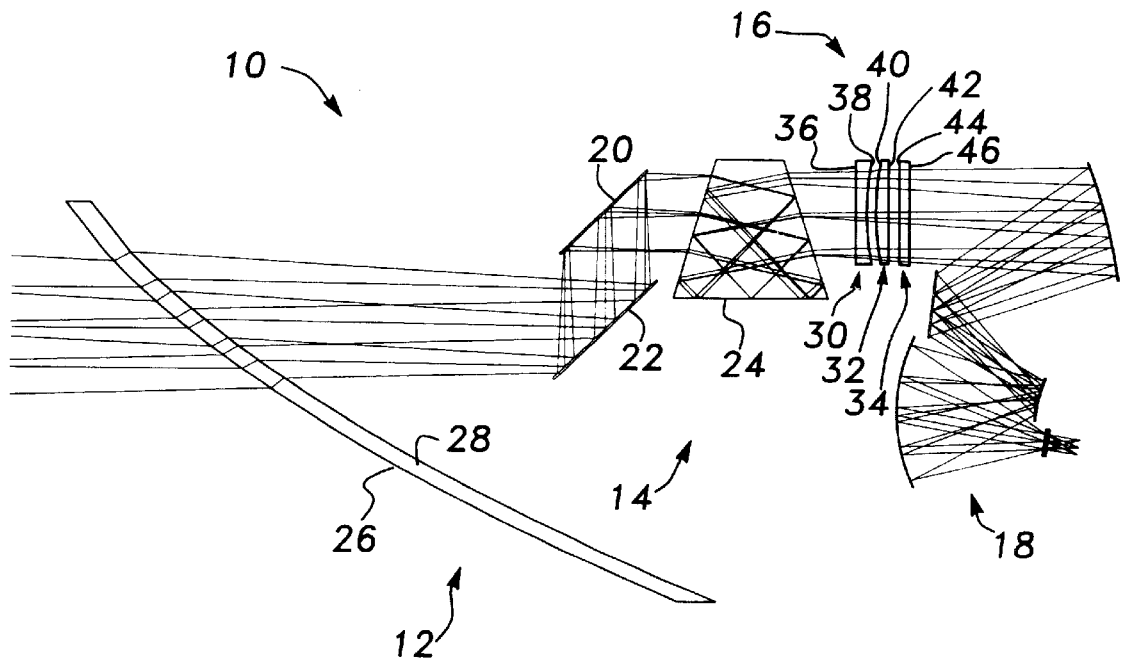
FIG. 1 is a raytrace of an optical sensor in combination with an aberration generator and conformal window in accordance with the present invention in the look forward position.
Figure 2:
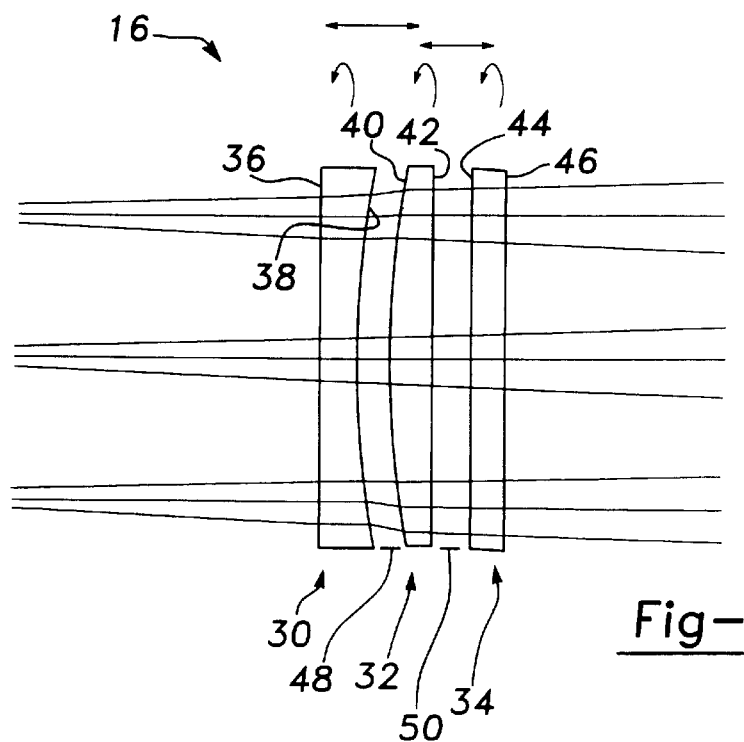
FIG. 2 is an elevation view of the lenses of the aberration generator.

Turning to the figures, particularly FIG. 1, an optical sensor assembly is illustrated and designated with the reference numeral 10. The assembly includes a conformal window 12, a system field of regard 14 (not shown), an aberration generator 16 and a sensor field of view 18. The sensor 18 may be a desired electrical optical sensor for a desired application. The system field of regard is achieved with a pair of movable pointing mirrors 20 and 22. The field of regard is from about plus five (+5°) degrees to minus thirty (−30°) degrees in elevation by plus sixty (60°) degrees to minus sixty (−60°) degrees in azimuth. This embodiment has a two-inch entrance pupil and is operated at long wave infrared where the average wave length is 8.5 microns. However, while this example demonstrates one chosen configuration, the methodology is applicable to conformal windows for any given set of system requirements.

The conformal window 12 includes an outer surface 26 and an inner surface 28. The conformal window 12 is a decentered concentric paraboloid. Another example of an appropriate shape are the Von Karman ogival forms, which have been found to minimize drag and shock wave disturbances related to aerodynamic properties of a vehicle. The use of an ogival shape introduces much more severe higher order aberration than a simple cylinder as those described in prior art.

The inner surface 28 is different from the outer surface 26. The inner surface is a more complex bilaterally symmetric Zernike described aspheric which optimizes higher order aberrations, noticeably excluding lower order focus and astigmatism. The paraboloid outer surface 26 has a conic constant equal to minus one (−1) and a base radius of six inches. The axial thickness of the window is 0.5 inches and the material is zinc selenide. The inner surface 28 is also parabolic but with a base radius of 5.5 inches and higher order Zernike terms. The mathematical equation for the outer surface as well as the inner surface are illustrated below. The Zernike equation is as follows:

$$\text{TOTAL SURFACE SAG} = Z_{TOTAL} = \frac{c\rho^2}{1 + \sqrt{1 - (k+1)c^2\rho^2}} + Z_{ZERN}$$

where:
 c=CURVATURE=1/RADIUS
 $\rho^2 = x^2 + y^2$ =TANGENT PLANE POLAR COORDINATE
 k=CONIC CONSTANT $$Z_{ZERN} = \text{SAG DUE TO ZERNIKE TERMS} = \sum_{i=1}^{24} S_i Z_i(x, y)$$

$Z_4 = x^2 + y^2$
$Z_5 = x^2 - y^2$
$Z_8 = y(x^2 + y^2)$
$Z_{10} = y(3x^2 - y^2)$
$Z_{11} = (x^2 + y^2)^2$
$Z_{12} = x^4 - y^4$
$Z_{14} = x^4 - 6x^2y^2 + y^4$)
$Z_{17} = y(x^2 + y^2)^2$
$Z_{19} = 3x^4y + 2x^2y^3 - y^5$
$Z_{21} = 5x^4y - 10x^2y^3 + y^5$
$Z_{22} = (x^2 + y^2)^3$
$Z_{23} = (x^2 + y^2)^4$

The prescription for the conformal window is as follows:

| | Radius | Conic Constant | Thickness | Material | Zernike Coefficients |
|---|---|---|---|---|---|
| Outer Surface | 6.0 | −1.0 | 0.5 | $Z_nS_e$ | None |
| Inner Surface | 5.5 | −1.0 | | air | |

$S_4 = -0.339 \times 10^{-2}$
$S_5 = -0.102 \times 10^{-3}$
$S_8 = -0.192 \times 10^{-4}$
$S_{10} = -0.102 \times 10^{-4}$
$S_{11} = -0.184 \times 10^{-4}$
$S_{12} = -0.671 \times 10^{-5}$
$S_{14} = -0.121 \times 10^{-5}$
$S_{17} = -0.687 \times 10^{-6}$
$S_{19} = -0.146 \times 10^{-6}$
$S_{21} = -0.155 \times 10^{-7}$
$S_{22} = -0.950 \times 10^{-7}$
$S_{23} = -0.119 \times 10^{-9}$ The aberration generator 16 includes three lenses 30, 32 and 34. The aberration generator requires only simple motions such as axially moving the lens 30 and 34 and rotating the lenses. The movement of lens 30 with respect to 32 compensates for focus while the movement of lens 34 with respect to 32 compensates for astigmatism. The rotation of the three lenses as a group will change the clocking or orientation of the astigmatism.

Lens 30 includes a planar surface 36 and a spherical surface 38. The lens is manufactured from zinc sulfide and has a thickness of about 0.2 inches. The lens 32 includes a spherical surface 40 and a cylindrical or toric surface 42. The lens is manufactured from zinc sulfide and has a thickness of 0.25 inches. A gap or air thickness 48 is between the lens 30 and 32 and by varying the gap will compensate for the focus.

The lens 34 includes a cylindrical or toric surface 44 and a planar surface 46. The lens is of a zinc sulfide material and has a thickness of about 0.2 inches. The gap 50 is present between the lens 32 and 34 and a change in the gap compensates for astigmatism.

The prescription for the aberration generator is as follows:

|   | Radius | Surface Type | Thickness | Material |
|---|--------|--------------|-----------|----------|
| 1 | ∞      | flat         | 0.20      | $Z_nS$   |
| 2 | 8.449  | sphere       | 0.1776    | air      |
| 3 | 8.680  | sphere       | 0.25      | $Z_nS$   |
| 4 | 16.910 | cylinder     | 0.1867    | air      |
| 5 | 16.910 | cylinder     | 0.20      | $Z_nS$   |
| 6 | ∞      | flat         |           | air      |

Figure 3:
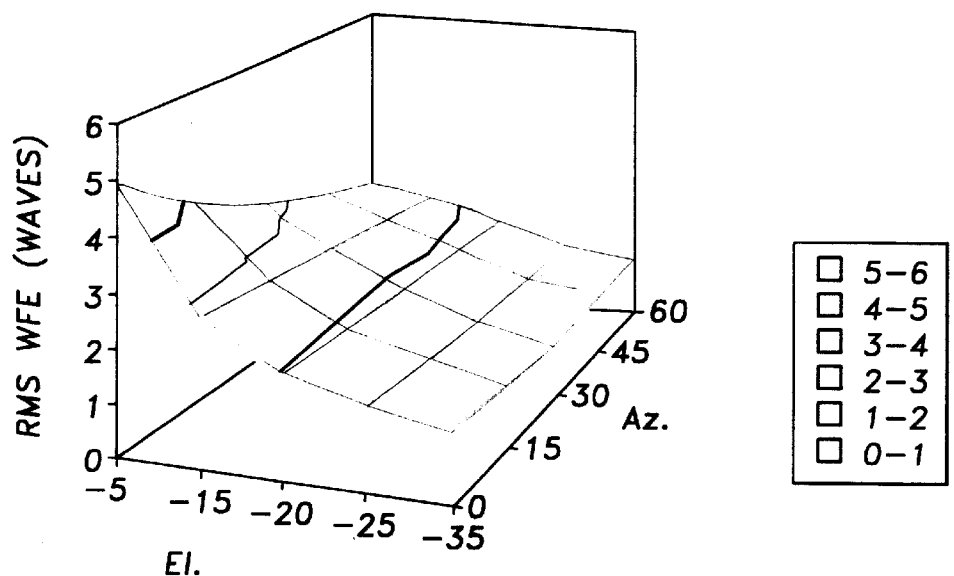
FIG. 3 is a graph of the wavefront error introduced by the decentered parabolic window surface.

The conformal window surface is a decentered concentric paraboloid. The nominal root means square (RMS) wave front error (WFE) introduced by this surface ranges from one to five waves across the field of view. It is orders of magnitude greater than any acceptable RMS WFE and demonstrates the typical magnitude of aberration introduced by any unoptimized conformal window. A graph of this root means square wave front error across the field of regard is illustrated in FIG. 3.

Figure 4:
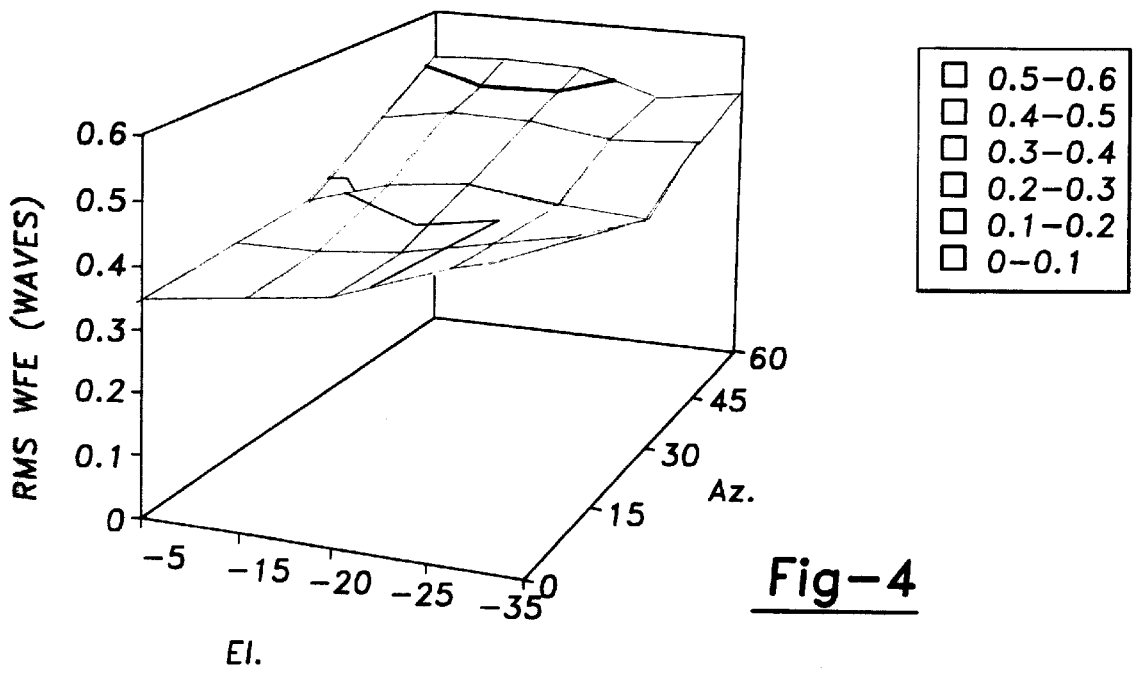
FIG. 4 is a graph of the wavefront error of the parabolic window after the inner surface has been optimized to reduce higher order aberrations.

To correct for this RMS WFE, it is critical to understand and characterize the wavefront error into the types and amount of aberration that compose it. This is done by decomposing the aberration wavefront into orthogonal Zernike aberration terms. The Zernike polynomials describe a complete set of aberrations that can occur in general conformal window shapes. Once the higher order aberrations are characterized, the window's inner surface is optimized as discussed above. A dramatic order of magnitude improvement in RMS WFE is achieved by optimizing the inner surface, resulting in only 0.3 to 0.5 RMS WFE, as illustrated in FIG. 4.

Figure 5:
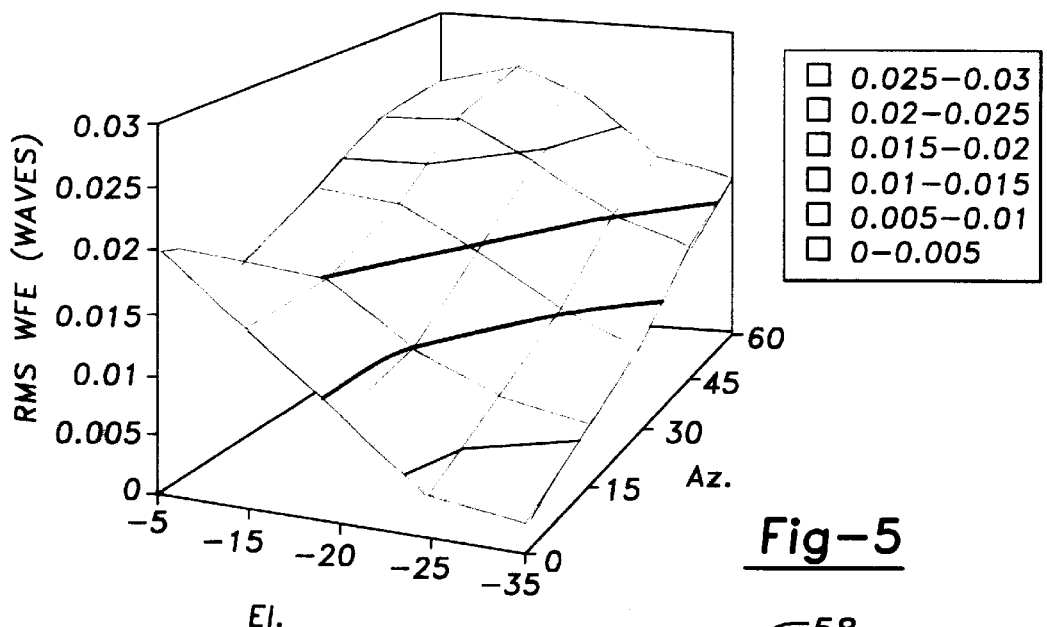
FIG. 5 is a graph of the wavefront error of the optimized parabolic window with the lower order aberrations of power and astigmatism removed.

The remaining WFE consists primarily of much lower order aberration terms such as power and astigmatism, which are purposely omitted from the inner surface optimization. Once characterized, these remaining low order aberrations are straight forward to correct dynamically over the field of regard by the aberration generator 16. The result of correcting the power and astigmatism gives impressive results of a mere 0.025 wave maximum RMS WFE as illustrated in the graph of FIG. 5.

The distance between the three lenses, as well as the rotation of the assembly, are adjustable and therefore capable of very precisely removing the power and astigmatism errors. The combination of three motion requirements exists. They are simple linear displacements, and a simple rotation. The three lenses provide accuracies typical of precision optical systems and speed sufficient to match maximum gimbal rates with adequate margin. The controller utilized to move the lenses is existing technology and conventional look-up table servo-controllers maintain the desired line of sight.

Figure 6:
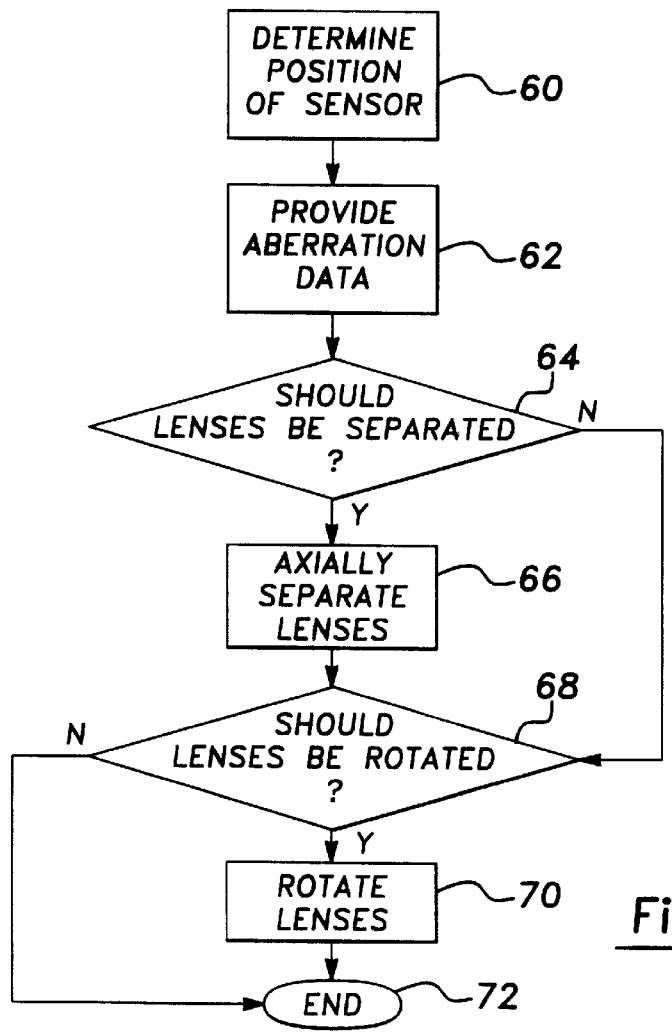
FIG. 6 is a flow chart illustrating for configuring the elements of the aberration generator in accordance with the present invention.

FIG. 6 is a flow chart 58 illustrating the operation of the elements 30, 32 and 34 of the aberration generator to eliminate optical aberration which is not corrected by the conformal window. The position of the sensor in the field of regard is determined, via step 60. Thereafter, the aberration data are provided via step 62. For example, the data may be obtained from a look-up table for the appropriate lens separation and lens rotation. The lens separation and rotation are determined by the shape of the conformal window, the index of refraction of the material from which it is constructed, its thickness, and the inner and outer surface shapes.

Next, it is determined whether the lenses 30 and 34 should be separated, via step 64. If it is determined that the lenses are to be separated, via step 64, the separation of the lenses is changed via step 66. Next the determination of whether the lenses should be rotated is made via step 68. If, on the other hand, the separation of the lenses does not need to be changed, the determination of whether the lenses should be rotated is made next via step 68. In either case, the next step is to determine if the lenses should be rotated. If, via step 68, it is determined that the lenses must be rotated, the lens rotation is carried out via step 70. Then, the process would end via step 72. If it is determined, via step 66, that the lenses need not be rotated, the process ends via step 72. In either case, the process of configuring the lenses responsive to the position via step 60 ends at the next step via step 72.

The invention incorporates the use of both an optical optimized conformal window and an aberration generator to compensate for varying amounts of lower order aberration introduced by the conformal shape of the window over the field of regard. The outer shape of the window is determined primarily to meet conformal requirements such as aerodynamic drag and radar cross section. The different types of aberration introduced by the window across the field of regard are then quantified, and the window's inner surface is optimized to reduce the higher order aberrations. The remaining lower order aberrations, including power and astigmatism, are then quantified and compensated for with a simple three element device located in afocal space behind the window. The present invention enables the conformal window to conform to the aircraft shape, reducing drag and radar cross section signature, while enabling the electro optical sensors to be positioned within the aircraft, such as on the wing, to enable internally mounted sensor configurations.

It is understood that the above described embodiments are merely illustrative of the possible specific embodiments which can represent applications of the principle of the present invention. Other arrangements may be readily devised in accordance with these principles by one of ordinary skill in the art without departing from the scope and spirit of the present invention.

What is claimed is:

1. A system for correcting optical aberration created by a conformal window comprising:

a conformal window having an outer surface and an inner surface, said inner surface being aspheric for compensating for higher order aberrations; and an aberration generator having a field of regard and aligned to receive input from said conformal window, said aberration generator dynamically correcting aberrations over the field of regard, said aberration generator compensating for lower order aberrations.

2. The system according to claim 1, wherein said conformal window outer surface is an off-axis portion of a paraboloid for improving aerodynamic performance.

3. The system according to claim 1, wherein said conformal window inner surface is a bilaterally symmetric Zernike described aspheric.

4. The system according to claim 1, wherein said aberration generator includes at least two lenses, said lenses being axially and rotatably movable.

5. The system according to claim 4, wherein said aberration generator focuses and compensates for astigmatism.

6. A conformal window for use in an aircraft between an inner optical device and an outer environment wherein electromagnetic radiation is conveyed between said outer environment and said optical device through said window and wherein said optical device has a field of regard through said window, said window comprising:

an outer surface facing said outer environment having a configuration of an off-axis portion of a paraboloid to optimize aerodynamic properties, said configuration generating lower order aberrations and higher order aberrations through said optical device field of regard; and an inner surface facing said optical device having an aspheric surface for compensating said higher order aberrations generated by said outer surface through said field of regard.

7. The system according to claim 6, wherein said conformal window inner surface is a bilaterally symmetric Zernike described aspheric.

8. The conformal window according to claim 7, wherein the inner surface is parabolic.

9. The conformal window according to claim 8, wherein the inner surface is defined by a Zernike polynomial where $$Z = c\rho^2 \Big/ \left[1 + \sqrt{1 - (k+1)c^2\rho^2}\right] + d\rho^4 + e\rho^6 + f\rho^8 + g\rho^{10} + \sum_{i=1}^{24} S_i Z_i.$$

10. An optical sensor assembly comprising:
a conformal window including an outer and inner surface, said inner surface being aspheric for compensating for higher order aberrations;

an aberration generator having a field of regard and aligned to receive input from said conformal window, said aberration generator dynamically correcting aberrations over said field of regard, said aberration generator compensating for lower order aberrations; and said aberration generator comprising an optical system and wherein said conformal window inner surface and aberration generator compensate for optical aberration created at every position within the field of regard of the optical sensor.

11. The optical sensor assembly according to claim 10, wherein said conformal window outer surface is an off-axis portion of a paraboloid for improving aerodynamic performance.

12. The optical sensor assembly according to claim 10, wherein said conformal window inner surface is a bilaterally symmetric Zernike described aspheric.

13. The optical sensor assembly according to claim 10, wherein said aberration generator includes at least two lenses, said lenses being axially and rotatably movable.

14. The optical sensor assembly according to claim 13, wherein said aberration generator focuses and compensates for astigmatism.

15. The optical sensor assembly according to claim 10, wherein said aberration generator includes three lenses being axially and rotatably movable.

* * * * *